July 29, 1941.   C. F. SULLIVAN   2,250,846
GRASS CATCHER
Filed Sept. 4, 1940   2 Sheets-Sheet 1

INVENTOR
Clarence F. Sullivan
BY
ATTORNEY

July 29, 1941.   C. F. SULLIVAN   2,250,846
GRASS CATCHER
Filed Sept. 4, 1940   2 Sheets-Sheet 2

INVENTOR
Clarence F. Sullivan
BY
Scott L. Nouriel
ATTORNEY

Patented July 29, 1941

2,250,846

UNITED STATES PATENT OFFICE 2,250,846

GRASS CATCHER

Clarence F. Sullivan, Maricopa County, Ariz.

Application September 4, 1940, Serial No. 355,316

6 Claims. (Cl. 56—202)

This invention pertains to grass catchers of the type ordinarily attached to the rear of lawn mowers having rotary blades so that the grass is thrown backward from the mower when in operation.

The invention has for its objects:

First, to provide a grass catcher having a body including a frame so as to be easily attached and detached from the mower, from a standing position;

Second, to provide a grass catcher having a comparatively large capacity, and provided with wheeled supports which may be lowered to the ground so that the body of the catcher basket is raised above the ground and it can be freely moved on said wheels, together with mechanism conveniently positioned on an upwardly extending handle which will operate the wheeled support to lower the basket portion of the device into mowing position at the rear of a mower;

A third object is to provide a grass catcher having a basket of a width greater than the blades of the mower to which it is attached and provided with wheeled supports which may be easily moved from a rolling position where the wheels bear upon the ground to mowing position where the basket may be lowered to its position on the mower by leverage means positioned within easy reach of the operator on the supporting handle of the basket;

A fourth object is to provide a grass catcher with a metal frame on which a canvas basket is removably attached and having wheeled means for support, including an upwardly extending arched handle whereby the basket may be easily rolled on said wheels and retractive means whereby the wheels may be moved to an inoperative position and the basket lowered on and connected to the mower;

A fifth object is to provide a grass catcher, as above described, in which a draw bar adapted to engage hooks on the mower is provided to extend across the entire front of the basket body so as to enable the basket to be positioned on the mower at various desired lateral positions with reference to the cutter blades;

A sixth object is to provide a grass catcher having a canvas basket supported on a metallic framework so as to be easily replaceable, said framework to include an upwardly extending handle portion by which the basket may be lifted and moved, together with retractable wheels attached to said framework and operative means positioned on said handle to move said wheels from a lowered rolling position to a retracted position; and A seventh object provides for the construction and manufacture of the above described devices with a minimum number of parts, to provide a structure which may be easily and economically manufactured and maintained.

Other objects will appear hereinafter.

I attain the foregoing objects by means of the devices and structure shown in the accompanying drawings, in which—

Figure 1 is a side elevation of the catcher with the wheeled supporting means in lowered or operative position;

Figure 2, a side elevation of the device with the wheels retracted and the basket lowered to operative position on the mower;

Similar numerals refer to similar parts of the several views.

Figure 4:
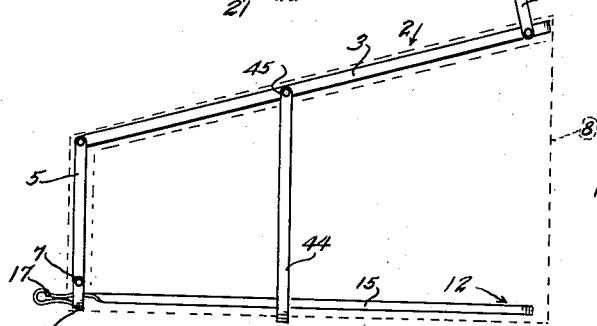
Figure 4 is a side elevation of the basket supporting frame.
Figure 6:
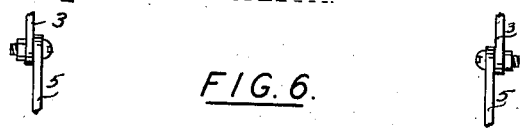
Figure 6 is a plan view of the combination draw bar and crank axle.

The basket supporting frame (see particularly Figure 4) consists of a U-shaped top member 2 having the two side arms 3, extending forwardly from a rear bar 4. At the front end of each side arm there is a supporting standard 5 attached by a bolt. These standards are connected at their lower ends to upturned ends 7 of a bottom front cross bar 6 by machine bolts. The arms 3 and back bar 4 are preferably made of strap metal and support a basket 8 which has a rectangular shaped bottom 48 with sides 9 and a back 10 extending upward therefrom. The basket is preferably made of heavy canvas. The front edge of each side is attached to each standard 5 by a hem pocket in which the standard is inserted, and the top edge of each side 9 and the top edge of the back 10 are each provided with similar hem pockets through which the U-shaped frame member 2 is inserted. The canvas basket is therefore suspended from the top frame member 2; the front end of which is supported by standards 5. The front edge of this basket is also provided with a hem pocket to receive the front cross bar 6. The position of this canvas basket and the hem pockets is indicated in Figure 4 by the dotted lines 13 to show its relative position on said frame members.

The rear of this frame is supported by two metal straps 11 attached on the outside of the basket by bolts extending through the rear portion of the side frame members 3.

Figure 5:
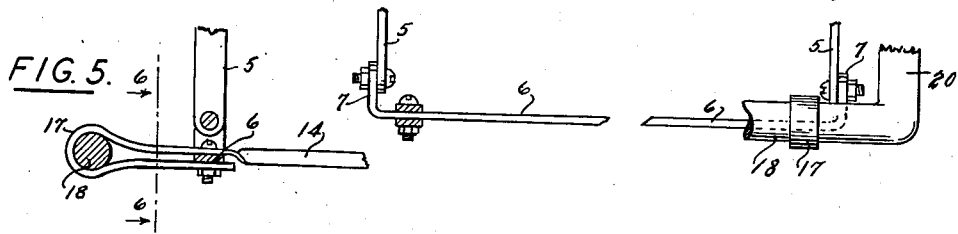
Figure 5 is a side elevation of a means of attaching the draw bar to the basket frame.

Within the basket a spreader bottoming piece 12 is positioned so that it follows the sides and back of the inner perimeter of the bottom of the basket. This is U-shaped and has side arms 14 and 15 extending forward from a rear bar 16. This is made of strap metal and the sides and rear bar are set edgewise. Near the forward ends the side bars 14 and 15 are twisted at right angles and the flat portions thus provided are brought forward and bolted near the upturned ends 7 of the front frame bar 6 (see Figure 5). The material is then carried forward and formed into a loop 17 adapted to form a bearing for the drawbar 18. Thus the draw bar is supported by bearings near each forward edge of the basket frame. Draw bar 18 is formed integral with the crank axles 19 and 20, which are made by bending this bar rearwardly at right angles. These rearwardly extending portions may be referred to as the cranks. At the end of each of the cranks the bar is bent outward to form axles 21 supporting wheels 22. Preferably these are small rubber-tired wheels approximately 7 inches in diameter.

Approximately half way between the draw bar and the axles the cranks 19 and 20 are pierced by holes to receive bearing bolts 23 to which the lower ends of the U-shaped handle are pivoted. This handle is preferably made of light tubular metal, its side members 25 being of a sufficient length so that the rear cross member 26 extends upward and to the rear of the rear edge of the basket frame. The bolts 23 form hinge joints for the lower ends of this handle on the cranks 19 and 20. This handle is proportioned so that the cross bar 26 preferably rides on top of the lawn mower handle 27 has shown particularly in Figures 1 and 2. However, when the device is attached to power driven mowers having control levers on top of their handles, this cross bar may be easily attached to a hook beneath the handle.

Near their upper ends, the side members of the handle 25 are pierced to receive machine bolts at 28 and 29. Rear supporting straps 11 are attached on the inside of the handle side members by these bolts. The rear end of the basket is supported in this manner. The bolt 29 on the left handle member 25 extends outwardly a sufficient distance to form a bearing for raising and lowering operative lever 30. This lever is provided with a handle portion 31 at the outer end of a curved middle portion 32 and is pierced at 33 to receive pivot bolt 29. The body of the lever extends beyond this pivot bearing to form a lever portion 34. At the end of this lever a pivot bolt 35 is attached and connected to a push bar 36, which extends downward with its lower end journalled on the axle 21 of crank 20.

Figure 1:
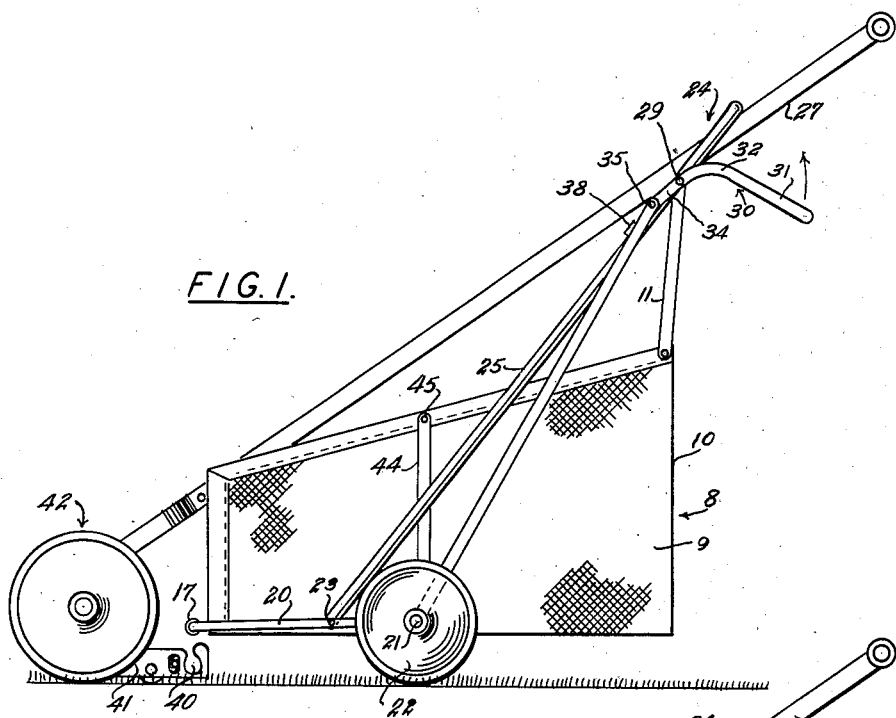
Figure 2:
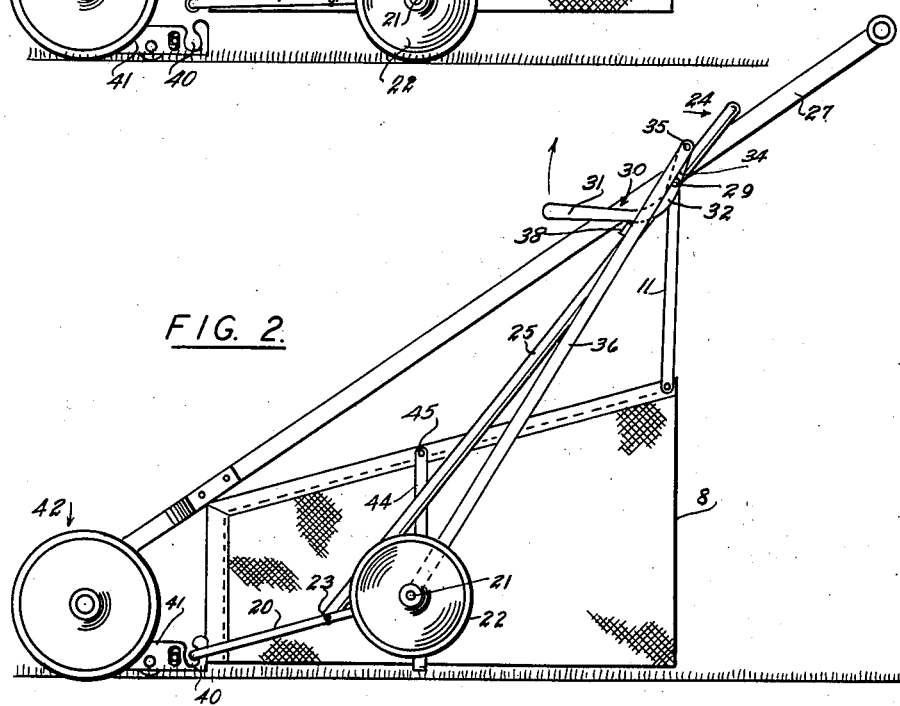
Figure 3:
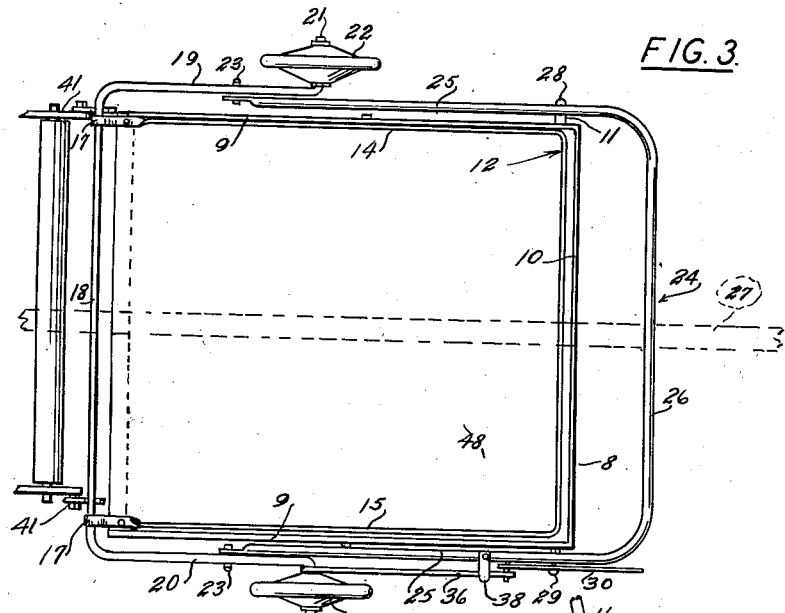
Figure 3 is a plan view of the basket in position on the mower.

Lever 30 swings from the position shown in Figure 1, in which the lever portion 34 is extended downwardly to the position shown in Figure 2, where the lever portion is extended upwardly carrying the push bar 36 upward. The combination of these parts forms a retracting means in conjunction with the wheel supporting axles 21 and their cranks so that the wheels may be either lowered to a rolling position below the bottom of the basket, as shown in Figure 1, whereby the basket may be easily supported and rolled on these wheels, to the raised position as shown in Figure 2, where the wheels are drawn above the bottom of the basket, and whereby the draw bar 18 is lowered into the lawn mower attachment hooks 40 which extend from the rear body portion 41 of the lawn mower 42.

It will be noted that the lever handle 30 is limited in its movement counter clockwise by means of a stop 38 attached to the left hand bar 25 of the handle 24 at a position so that in both extremities of its motion (Figures 1 and 2) the push bar 36 engages this stop. The position of engagement is such that the pivot bolt 35 extends beyond the dead center line between the wheel axis 21 and the axis of bolt 29 supporting lever 30. Thus the weight of the basket resting on the wheels and pushing upward on push rod 36 holds it against stop 38 when the wheels are in the lowered position (Figure 1), and the weight of the wheels pulling downward hold it in the retracted position (Figure 2). In this latter position the stop is also engaged by the handle portion 31 of lever 30.

In operation, the basket is grasped by the rear bar 26 of the handle 24 and rolled to the position shown in Figure 1, just to the rear of mower 42. Lifting handle 30 is then moved from the position shown in this figure to that shown in Figure 2, whereupon rolling wheels 22 are retracted and the basket lowered. The position of draw bar 18 with reference to the mower hooks 40 is easily maintained as the basket is lowered, whereupon it is connected to the mower, the forward end being supported by a draw bar 18 in hooks 40 and the rear end by contact of handle cross bar 26 with the mower handle 27. Since draw bar 18 extends across the entire front of the basket frame it may engage hooks 41 at any desired lateral position. The basket and frame may be made wider than the mower and shifted right or left, as desired, to catch grass blown sideways or thrown slightly sideways by the curved mower blades.

The mower is then operated in the usual manner, and when it becomes necessary to remove the empty basket, lifting handle 30 is moved to position shown in Figure 1, whereupon the draw bar 18 is disengaged from the mower hooks. The basket may be then easily rolled on the running wheels 22 and the width of the handle 24 permits it to be easily withdrawn over the mower handles. The basket may then be emptied at any convenient place and replaced as above described.

I have found that a canvas bottom for the basket is more satisfactory than any metallic bottom since with the structure above outlined, the bottom of the basket is supported so as not to contact the grass during operation of the mower. The parts are so proportioned and the links 11 are particularly proportioned to gain this effect. To provide additional support for the bottom of the basket, I have added a U-shaped cradle 44 made of strap metal, extending under the bottom of the basket at approximately its middle, with the side members thereof extending up the sides of the basket and attached on the outside of side members 3 of the basket frame top by bolts 45 extending through both pieces. The side members of this cradle are so proportioned that the canvas bottom of the basket is suspended laterally. The portions of the basket bottom ahead of and to the rear of the cross bar of this piece bulge downward slightly when the device is filled with grass. The cross bar thus forms a ridge in the bottom of the basket which prevents the grass from working forward during mowing.

While I have described the foregoing as one embodiment of my invention, I realize that to others familiar with the art, various modifications and changes may suggest themselves, all of which may well be within the spirit of the invention and, therefore, I wish to be limited only by the following claims.

I claim:

1. A grass catcher for lawn mowers, comprising, in combination, a frame, means of attachment thereof to a lawn mower, a handle extending upward and rearwardly therefrom and adapted to be supported by the lawn mower handle, a basket suspended by said metal frame, and retractable wheeled supporting means attached to said frame and mechanism including a lifting handle and a push rod connected to said wheel supporting means whereby said wheel supporting means may be lowered to a rolling position and optionally raised to retracted position.

2. A grass catcher for lawn mowers comprising a metal frame adapted to support a basket of pliant material attached to said frame, a transverse draw bar attached to the forward end of said frame and adapted to engage hooks in the rear frame of a lawn mower, the ends of said draw bar being bent rearwardly forming cranks on each side of said frame and the ends of said cranks bent outwardly to form axles for supporting wheels, a U-shaped handle, the ends of the prongs of which are pivotally attached to approximately the middle of said cranks, wheels attached to said axles and mechanism adapted to raise and lower the axle supports of said wheels whereby they may be raised into a retracted position above the bottom of said basket and lowered to a rolling position whereby the entire device may be supported thereon.

3. A grass catcher comprising, in combination, a metallic frame having an upper U-shaped member adapted to support a basket of pliant material, standards extending downward from the forward ends thereof and attached to a front cross member, a U-shaped spreader attached to said cross member near the outer ends of its prong members and extending rearwardly to form a stiffening means for the inside of a basket suspended from said top member, the forward ends of said spreader member being looped to form bearings to support a transverse draw bar, a transversely positioned draw bar supported in said loops extending across the front of said frame, having rearwardly extending crank members provided with outwardly extending axles at their ends, rolling wheels supported on said axles, a U shaped handle, the prong ends of which are pivotally attached to approximately the middle of said cranks and the curved portion of which extends upward and rearwardly above said frame, with the cross bar thereof adapted to be supported by a lawn mower handle, a basket of pliant material supported on said upper frame member along its upper edges and by said standards along its front edge and adapted to receive said spreader member within its bottom portion, and retraction means operative on said wheels whereby they may be lowered below the bottom of said basket to afford rolling means for said entire framework and basket and may be raised to a retracted position above the bottom of said basket.

4. A grass catcher comprising, in combination a metallic frame having an upper U-shaped member adapted to support a basket of pliant material, standards extending downward from the forward ends thereof and attached to a front cross member, a U-shaped spreader attached to said cross member near the outer ends of its prong members and extending rearwardly to form a stiffening means for the inside of a basket suspended from said top member, the forward ends of said spreader member being looped to form bearings to support a transverse draw bar, a transversely positioned draw bar supported in said loops extending across the front of said frame, having rearwardly extending crank members provided with outwardly extending axles at their ends, rolling wheels supported on said axles, a U-shaped handle, the prong ends of which are pivotally attached to approximately the middle of said cranks and the curved portion of which extends upward and rearwardly above said frame, with the cross bar thereof adapted to be supported by a lawn mower handle, a basket of pliant material supported on said upper frame member along its upper edges and by said standards along its front edge and adapted to receive said spreader member within its bottom portion, and retractive mechanism including a lever pivotally supported on one side of the top portion of said handle, a push bar attached thereto at its upper end and journalled on a wheel axle at its lower end so that operation of said lever handle will move said wheel axles upward and downward relative to said pivotal connection between said cranks and said handle ends whereby said wheels may be moved from a retracted upward position to a downwardly extending rolling position.

5. A grass catcher for lawn mowers, comprising a frame adapted to support a basket of pliant material attached thereto, a combined draw bar and wheel supporting means composed of a U-shaped bar, the web of which is attached to said frame to form a transverse drawbar and the arms of which extend rearwardly therefrom forming wheel supporting cranks each carrying an axle, wheels mounted on said axles, a U-shaped handle extending upwardly and rearwardly over said frame, the prongs of which are pivotally attached to said wheel supporting cranks and mechanism adapted to raise and lower said wheel supporting cranks, including an operative handle mounted on the upper portion of said U-shaped handle, a push rod link operatively connecting said operating handle to said cranks, and a stop on said frame limiting motion of said operating handle, said parts being arranged so that motion of said operative handle will move said wheel supporting cranks from a retracted position above the bottom of said basket to a lowered rolling position.

6. A grass catcher for lawn mowers, comprising a frame adapted to support a basket of pliant material attached thereto, a transverse drawbar attached to the forward end of said frame and adapted to engage hooks in the rear portion of a lawn mower, the ends of said drawbar being bent rearwardly to form wheel supporting cranks on each side of said frame and axles formed on the ends thereof, wheels supported on said axles, a U-shaped handle, the prongs whereof being pivotally attached to said wheel supporting cranks, in combination with retracting mechanism including an operative handle positioned on the upper portion of said U-shaped handle and a push rod operatively connecting said handle to said wheel supporting cranks whereby motion of said operating handle will move said wheels on the axles on said cranks from an upper retracted position to a lowered rolling position.

CLARENCE F. SULLIVAN.